(12) United States Patent
Kokubu et al.

(10) Patent No.: US 6,615,649 B1
(45) Date of Patent: Sep. 9, 2003

(54) TIRE CHUCK APPARATUS AND METHOD

(75) Inventors: Takao Kokubu, Tokyo (JP); Tomoyuki Kaneko, Tokyo (JP); Norimichi Uchida, Tokyo (JP); Yoshiaki Hirata, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/589,075

(22) Filed: Jun. 8, 2000

(30) Foreign Application Priority Data

Jun. 8, 1999 (JP) .......................................... 11-160478

(51) Int. Cl.⁷ ............................................. G01M 17/02
(52) U.S. Cl. ........................................ 73/146; 157/1.17
(58) Field of Search .............................. 73/146; 198/19, 198/20; 250/350, 52; 157/1.17

(56) References Cited

U.S. PATENT DOCUMENTS

| | | | |
|---|---|---|---|
| 2,690,207 A | | 9/1954 | Godfrey, Jr. |
| 3,728,542 A | * | 4/1973 | Golfier .......................... 73/146 |
| 3,801,786 A | * | 4/1974 | Neuhaus ....................... 73/146 |
| 3,960,260 A | * | 6/1976 | Azuma et al. ................ 198/19 |
| 4,262,727 A | * | 4/1981 | Schifferly ................... 157/1.24 |
| 4,450,738 A | * | 5/1984 | Tupper et al. ................. 82/82 |
| 4,643,101 A | * | 2/1987 | Theurer .......................... 104/2 |
| 4,677,848 A | * | 7/1987 | Flory ........................... 73/146 |
| 5,222,538 A | * | 6/1993 | Tomita et al. .................. 157/1 |
| 5,826,319 A | * | 10/1998 | Colwell et al. ............... 73/146 |

FOREIGN PATENT DOCUMENTS

| | | |
|---|---|---|
| DE | 2 344 479 | 8/1974 |
| JP | 62-53807 A | 3/1987 |
| JP | 5-35907 | 2/1993 |
| JP | 5-177637 | 7/1993 |
| JP | 7-300222 | 11/1995 |
| WO | WO 00/26128 | 5/2000 |

* cited by examiner

*Primary Examiner*—Edward Lefkowitz
*Assistant Examiner*—Alandra Ellington
(74) *Attorney, Agent, or Firm*—Sughrue Mion, PLLC

(57) ABSTRACT

The present invention discloses a tire chuck apparatus for holding a tire having a tire bead. The apparatus comprises: a gripping mechanism with at least two gripping members movable in tire radial direction from a retracted position to an extended position for pressing against the inner side of the bead portion of the tire, thereby holding the tire; gripping rollers as the gripping members adapted to be rotatable around an axis substantially parallel to a central axis of the tire; and a rotation drive mechanism for rotating the tire around the central axis of the tire. According to this apparatus, even if the center of the tire and the center of the chuck are out of alignment with each other, by rotating the gripping rollers so as to rotate the tire, the tire is shifted so that the center thereof is aligned with the center of the chuck apparatus, thus reducing mispositioning.

20 Claims, 9 Drawing Sheets

TIRE CHUCK APPARATUS AND METHOD

BACKGROUND OF THE INVENTION

1. Field of the Invention

The present invention relates to a tire chuck apparatus and method for gripping a tire from the inner side of the bead portion.

2. Description of the Related Art

Unprocessed tires and vulcanized tires (finished products) are generally gripped for various reasons. Tires are gripped in order to insert or take out a tire in a vulcanizing mold in a tire manufacturing process, or in order to collect and ship tires in a physical distribution process, or in order to be shipped in or out in a sales process.

A known conventional chuck apparatus for gripping tires in these types of processes is one provided with, for example, a supporting member capable of moving in the central axial direction of the tire and at least two gripping claws supported by the supporting member such that the gripping claws can expand and contract in the radial direction of the tire. In this chuck apparatus, by moving the supporting member in the central axial direction of the tire when each of the gripping claws is contracted in the radial direction of the tire, each gripping claw is inserted within the tire bead portion of a tire placed horizontally on a roller conveyor, loading stand, or the like. By then expanding each of the gripping claws in this state in the radial direction of the tire, the tire bead portion is gripped from the inner side.

However, in this type of conventional tire chuck apparatus, the problem arises that the tire is sometimes gripped in a state in which the center of the tire is out of position. The reason for this occurring is described below.

Namely, if the central axis of the tire and the center of the chuck apparatus gripping the tire (the center of a single circle running through all the gripping claws) are not aligned, when the gripping claws expand in the radial direction of the tire, the gripping claws contact the internal periphery of the tire bead portion one after the other with a small time difference between each contact. If, at this time, the amount of friction resistance between the tire and the roller conveyor or loading stand is large enough that the tire is unable to move, the tire bead portion is pushed by the gripping claw which makes contact first and is slightly deformed in portions. As a result, the tire ends up being gripped by the gripping claws in a state in which the central axis of the tire is not aligned with the center of the chuck apparatus.

Furthermore, because the above described gripping claws only hold the tire as it is and cannot rotate the tire, when performing an inspection over the entire periphery of the tire, it is necessary to rotate the inspection apparatus or the like around the periphery of the tire which results in the problem that the apparatus as a whole is large and expensive.

SUMMARY OF THE INVENTION

The aim of the present invention is to provide a tire chuck apparatus and method in which the size of the apparatus can be reduced and the cost thereof decreased and at the same time gripping of a tire by gripping mechanism at a misaligned position can be reduced.

In order to achieve the above objectives, the first aspect of the present invention is a tire chuck apparatus for holding a tire having a tire bead, the apparatus including a gripping mechanism with at least two gripping members movable in tire radial direction from a retracted position to an extended position for pressing against the inner side of the bead portion of the tire and thereby holding the tire, gripping rollers as the gripping members adapted to be rotatable around an axis substantially parallel to a central axis of the tire, and a rotation drive mechanism for rotating the tire around the central axis of the tire.

In the above aspect, when gripping a tire, firstly, each gripping roller (gripping member) which has been moved to the inner side in the radial direction of the tire is inserted along the central axis of the tire into the inner side of the tire bead portion. From this state, each gripping roller is then expanded to the outer side in the radial direction of the tire. If the central axis of the tire is not aligned with the central axis of the chuck apparatus (the center of a single circle passing through all of the gripping rollers) at this point, the gripping rollers make contact one after another with the inner periphery of the tire bead portion with a short time difference between the contact by each roller.

If the tire is unable to move at this time, the tire bead portion begins to undergo slight partial deformation as it is pushed by the gripping claw which makes the first contact. In the present invention, however, by rotating the tire around its central axis using the rotation drive means, the tire is shifted to a position in which all of the gripping rollers make contact with the inner periphery of the tire bead portion.

At this point, because the gripping rollers contacting the tire bead portion rotate around an axis parallel to the central axis of the tire, the gripping rollers do not hinder the rotation of the tire. As a result, a movement of the tire such as that described above can take place easily and smoothly. Because of this, the above described deformation is prevented and the result of this is that mispositioning between the central axis of the tire and the center of the chuck apparatus is reduced. In short, the tire is gripped from the inside by the gripping rollers in a state in which the central axis of the tire has been accurately positioned relative to (coincided with) the center of the chuck apparatus.

Furthermore, after the tire has been gripped by the gripping rollers, if the tire is rotated around the central axis thereof by the rotation drive mechanism, it is possible to perform an inspection or the like over the entire periphery of the tire even if the inspection apparatus is stationary. As a result, there is no need to rotate the inspection apparatus or the like around the periphery of the tire enabling the size of the apparatus overall to be reduced and the production costs to be decreased. The inspection apparatus mentioned above may be a tire information reading mechanism, a surface condition reading mechanism, an internal condition reading mechanism, and the like.

In the second aspect of the present invention, a tire is rotated by at least one gripping roller being rotated by the rotation drive mechanism.

The structure of the second aspect enables the gripping rollers to also be used for the rotation of the tire which allows the structure to be simplified. Moreover, because the rotation force in the peripheral direction is applied from the gripping rollers to the bead portion which is the portion of a tire with the highest rigidity, the rotation of the tire can be accurately controlled.

In the third aspect of the present invention, a tire is rotated by all gripping rollers being rotated by the rotation drive mechanism.

The structure of the third aspect enables rotation force to be continuously applied to the tire from the time the first gripping roller makes contact with the tire bead portion. The result of this is that the alignment of the central axis of the tire with the center of the chuck apparatus is smoothly carried out.

In the fourth aspect of the present invention, the drive source of the rotation drive mechanism is placed in a central space (position) surrounded by gripping rollers.

The structure of the fourth aspect allows effective use to be made of empty space.

In the fifth aspect of the present invention, the tire information reading mechanism, the surface condition reading mechanism, the internal condition reading mechanism, or the like is attached to a member which moves in the central axial direction of the tire integrally with the gripping roller.

DESCRIPTION OF THE PREFERRED EMBODIMENTS

The first embodiment of the present invention will be described below based on the drawings.

Figure 1:
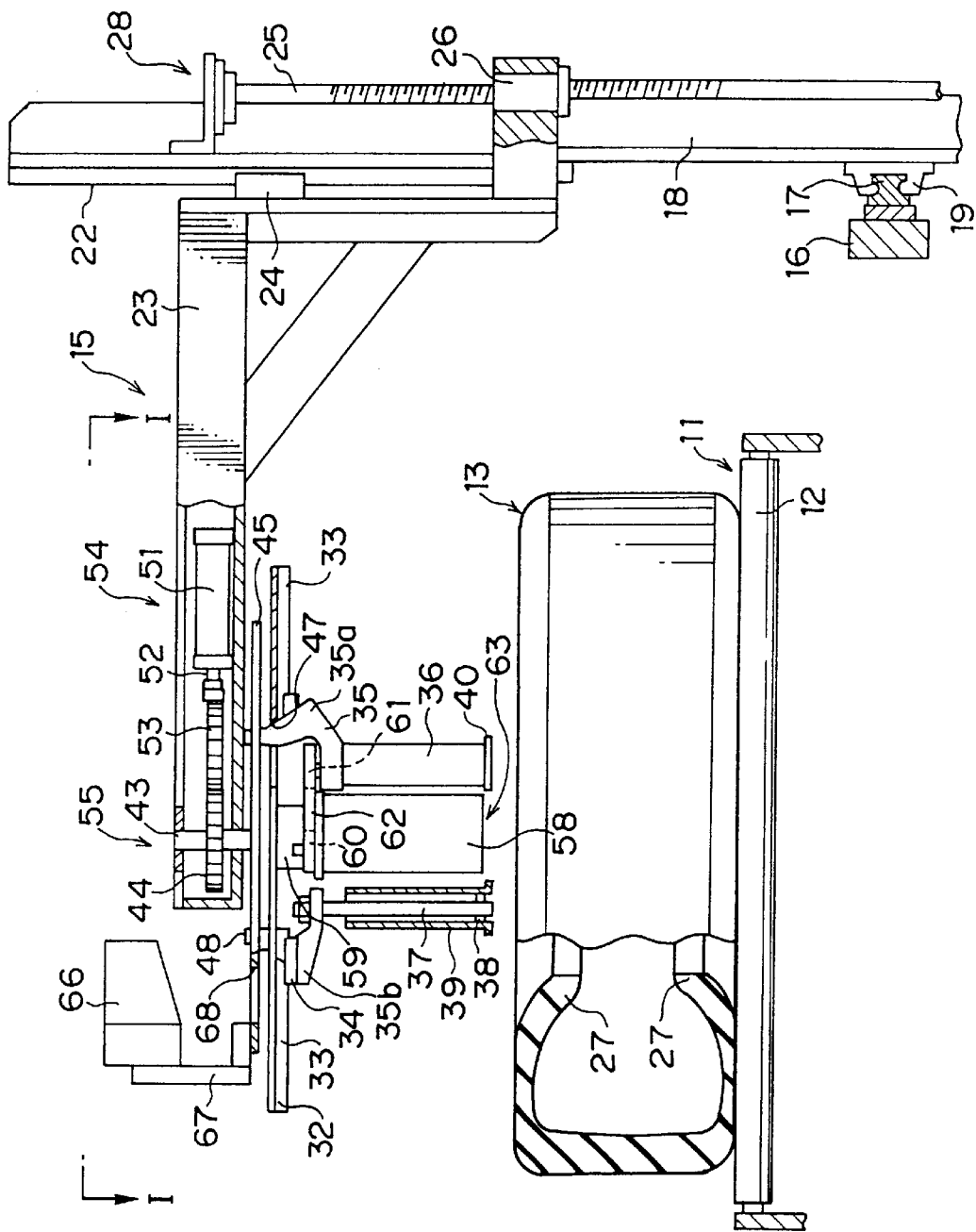
FIG. 1 is a partially broken-out front elevational view showing the first embodiment of the present invention.
Figure 2:
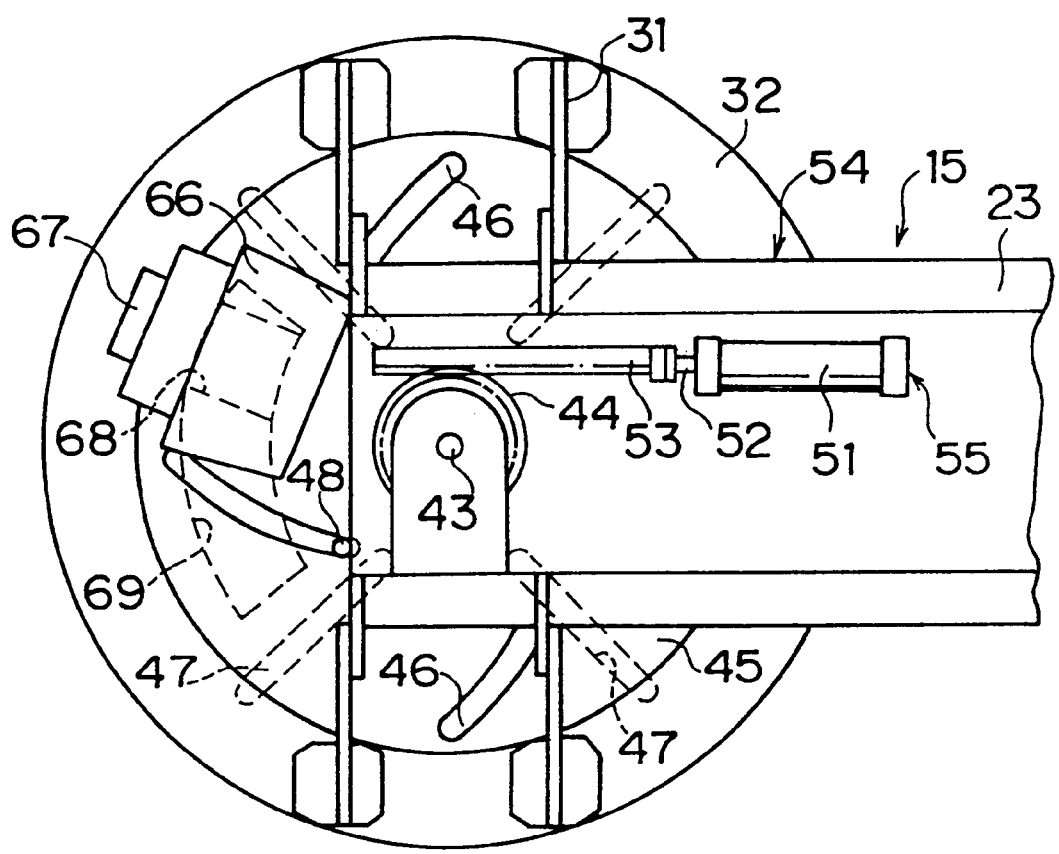
FIG. 2 is a view taken along the line between the arrows I—I in FIG. 1.
Figure 11:
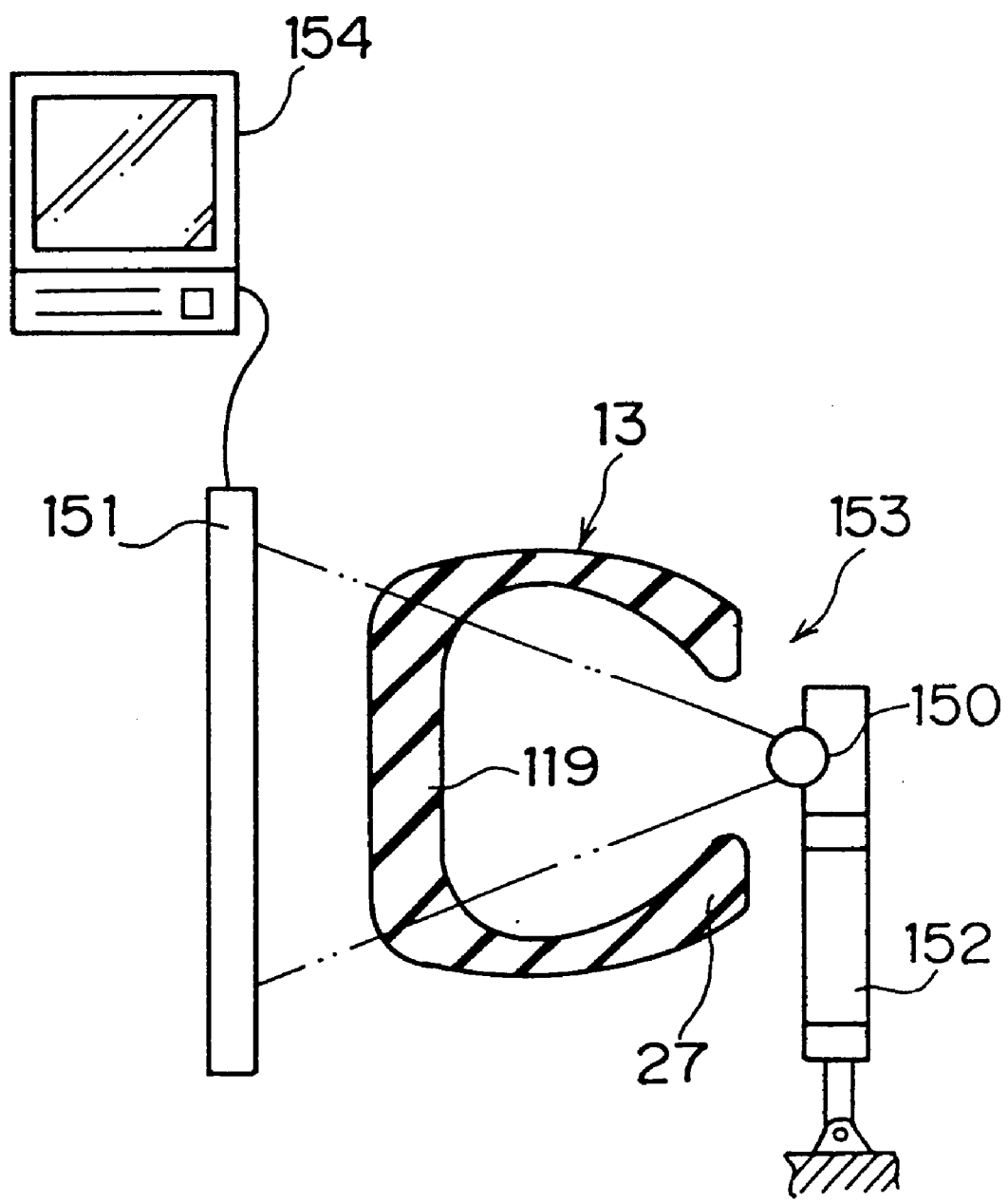
FIG. 11 is a front elevational view of the vicinity of internal information reading mechanism showing the ninth aspect of the present invention.

In FIGS. 1 and 2, 11 denotes a horizontal conveyor. The conveyor 11 is provided with a multiplicity of rollers 12 rotated by an unillustrated motor. A vulcanized tire 13 is placed horizontally on the conveyor 11 and is transported towards the downstream side of the conveyor 11 by the rotation of the rollers 12.

15 denotes a tire chuck apparatus installed in the vicinity of the conveyor 11. The chuck apparatus 15 is provided with a lateral beam 16 extending in the longitudinal direction of the conveyor 11. A slide bearing 19 mounted on the lower end portion of a support post 18 extending in a vertical direction is engaged with a guide rail 17 fixed to the lateral beam 16 so as to be able to slide along the guide rail 17. The support post 18 is moved in the longitudinal direction of the conveyor 11 by an unillustrated drive mechanism such as a cylinder or the like while being guided by the guide rail 17 and is positioned in a predetermined position.

A guide rail 22 extending in a vertical direction is fixed to a side face of the support post 18. A slide bearing 24 which is fixed to the base end portion of a vertically traveling frame 23 is engaged with the guide rail 22 so as to be able to slide along the guide rail 22. 25 denotes a threaded shaft which extends parallel to the guide rail 22 and is rotatably supported by the support post 18. A hollow threaded member 26 fixed to the base end of the vertically traveling frame 23 is meshed together with the threaded shaft 25.

The output shaft of an unillustrated motor mounted on the support post 18 is connected to the bottom end of the threaded shaft 25. This results in the vertically traveling frame 23 traveling vertically along the central axis of the tire 13 together with the aforementioned gripping rollers when the threaded shaft 25 is rotated by the operation of the motor. When a tire 13 is positioned directly below the gripping rollers, the gripping rollers are inserted from the top into the area within the bead portions 27 of the tire 13 by the downward traveling of the vertically traveling frame 23. The threaded shaft 25, the threaded member 26, and the motor taken as a whole constitute a vertically traveling mechanism 28 for moving the gripping rollers along the central axis of the tire 13.

A horizontal fixed circular plate 32 is mounted via four brackets 31 on the distal end portion of the vertically traveling frame 23 at a position directly above the conveyor 11. A plurality (normally two to eight and four in the present embodiment) of guide rails 33 extending in a radial direction are disposed on the bottom surface of the fixed circular plate 32 spaced equidistantly from each other in the peripheral direction.

34 denotes a slide bearing which is mounted to each of sliders 35 of which number is the same as that of the guide rails 33. The slide bearings 34 are engaged with the guide rails 33 so as to be able to slide along the guide rails 33.

A gripping roller 36 serving as a gripping member is rotatably supported by at least one of the sliders 35 (in this case the slider 35a). This gripping roller 36 extends in a vertical direction and is able to rotate around an axis parallel to the central axis of the tire 13. Supporting shafts 37 extending in a vertical direction are fixed to the other three sliders 35b. Gripping rollers 39 serving as gripping members extending in a vertical direction are supported by the supporting shafts 37 via bearings 38 so as to be freely rotatable around an axis parallel to the gripping rollers 36. Moreover, flange portions 40 are formed at the bottom external ends of at least two (in this case four) of the gripping rollers 36 and 39.

43 denotes a rotating shaft perpendicularly supported by the distal end of the vertically traveling frame 23 so as to be rotatable. A pinion 44 is fixed to the central portion of the rotating shaft 43. 45 denotes a horizontal rotating circular plate fixed to the bottom end of the rotating shaft 43. The rotating circular plate 45 is disposed between the vertically traveling frame 23 and the fixed circular plate 32. A plurality (in this case four to match the guide rails 33) of arc-shaped slits 46 all curving in the same direction relative to the radial direction are formed in the rotating circular plate 45. 47 denotes through slits extending parallel to the guide rails 33 and formed in the fixed circular plate 32 in the vicinity of the guide rails 33. The upper portion of each slider 35 penetrates through each of the through slits 47. Rollers 48, each of which is inserted into an arc shaped slit 46, are rotatably supported by the top end of each slider 35. All of these rollers taken together form the (tire) gripping mechanism of the present invention.

51 denotes a cylinder mounted on the vertically traveling frame 23. A rack 53 which meshes with the pinion 44 is fixed to the distal end of a piston rod 52 of the cylinder 51. As a result, when the cylinder 51 is operated and the piston rod 52 protrudes, the rotating circular plate 45 is rotated in the counter clockwise direction when looking at FIG. 2. Consequently, the sliders 35 and the gripping rollers 36 and 39 are moved simultaneously to the outer side in the radial direction while being guided by the guide rails 33 and (taken all together) expand in the radial direction of the tire. If, on the other hand, the piston rod 52 is retracted, the rotating circular plate 45 is rotated in a clockwise direction, resulting in the sliders 35 and the gripping rollers 36 and 39 being moved simultaneously to the inner side in the radial direction while being guided by the guide rails 33 and (taken all together) contracting in the radial direction of the tire. Namely, by simultaneously moving the sliders 35 and the gripping rollers 36 and 39 to the outer side and inner side in the radial direction, the gripping mechanism including the gripping rollers is expanded and contracted in the radial direction of the tire.

Taken as a whole, the vertically traveling frame 23, the brackets 31, the fixed circular plate 32, and the guide rails 33 form a supporting member 54 for supporting the two or more (four here) gripping members, namely the gripping rollers 36 and 39. Moreover, taken as a whole, the pinion 44, the rotating circular plate 45, the cylinder 51, and the rack 53 form an expansion/contraction mechanism 55 for expanding and contracting the gripping members, namely the gripping rollers 36 and 39, simultaneously in the radial direction of the tire.

Furthermore, by moving the gripping rollers 36 and 39 when they are in a contracted state relative to the radial direction of the tire so as to approach the tire 13 from the top along the central axis of the tire 13, the gripping rollers 36 and 39 are inserted inside the bead portion 27. If the gripping rollers 36 and 39 are then expanded from that state in the radial outer direction of the tire, the gripping rollers 36 and 39 make contact with the inner periphery of at least one of the bead portions 27 (in this case, the gripping roller 36 and 39 make contact only with the inner periphery of the upper bead portion 27) and grip the tire 13 from the inner side. As the gripping rollers 36 and 39 grip the tire 13 by expanding in the tire radial direction, then tires 13 of different sizes can be easily gripped.

A drive motor 58 serving as a drive source is disposed directly beneath the central portion of the fixed circular plate 32. The drive motor 58 is fixed to the bottom face of the fixed circular plate 32 via a bracket 59. In this case, the drive motor 58 is disposed in the central space surrounded by the gripping rollers 36 and 39 when they are contracted to the maximum in the radial direction of the tire (i.e. are moved to the inner limit in the radial direction), in a state where interference with the gripping rollers 36 and 39 is prevented. As a result, the empty space surrounded by the gripping rollers 36 and 39 can be effectively used.

60 denotes a pulley fixed to an output shaft of the drive motor 58. A belt 62 is suspended between the pulley 60 and a pulley 61 fixed to the top end of the three gripping rollers 36. As a result, when the drive motor 58 is operated, at least one (one in this case) of the gripping rollers 36 is driven to rotate. If, however, the gripping roller 36 comes into contact at this time with the internal periphery of the bead portion 27 of the tire 13, rotation force is applied to the tire 13 via the gripping roller 36 and the tire 13 is driven in its horizontal state to rotate around its central axis on the conveyor 11. In this case, an unillustrated dancer roller is engaged with the belt 62 and the dancer roller inhibits any slackness in the belt 62 during the movement of the gripping roller 36 in the tire radial direction.

Taken as a whole, the drive motor 58, the pulleys 60 and 61, and the belt 62 form a rotation drive mechanism 63 for rotating the tire 13 around the central axis thereof by rotating at least one gripping roller (in this case, one of the gripping rollers 36). If a rotation force is applied in this way to at least one of the gripping rollers (the gripping rollers 36) out of those gripping rollers gripping the tire 13, that gripping roller 36 can be used for rotating the tire 13. Consequently, the structure of the overall apparatus can be simplified. Moreover, because the rotation force in the peripheral direction is applied from the gripping roller 36 to the bead portion 27 which has the highest rigidity in the tire, deformation, slippage, and the like can be suppressed. Accordingly, the rotation of the tire 13 can be accurately controlled.

The rotation of a tire gripped by a plurality of conventional fixed gripping claws around its central axis by integrally rotating the gripping claws may also be considered here, however, in that case, the need for a large diameter bearing means that production costs would be increased. Moreover, because the rotation speed of the tire and the gripping claws would be the same, the concern would be that the accuracy of the rotation and stopping position of the tire would be decreased. In contrast to this, in the present embodiment, the small diameter bearings 38 are sufficient, which enables production costs to be kept low. Moreover, the accuracy of the rotation and stopping position of the tire 13 can be improved by controlling the rotation of the gripping rollers 36 since these have smaller diameters (and rotation speeds several times faster) than that of the tire 13.

66 denotes a tire information reading mechanism such s a camera or the like provided at the periphery of the tire (above the tire in this case). The tire information reading mechanism 66 is mounted on a member which moves along the central axis of the tire 13 integrally with the gripping rollers 36 and 39, in this case on a peripheral edge portion of the rotating circular plate 45 via a bracket 67. A substantially rectangular window 68 used for reading is formed penetrating through the rotating circular plate 45 directly beneath the tire information reading mechanism 66. Because the tire information reading mechanism 66 rotates together with the rotating circular plate 45, an arc-shaped window 69 used for reading is formed penetrating through the fixed circular plate 32 at a position thereof which overlaps the window 68 during rotation.

The tire information reading mechanism reads tire information affixed to the surface of the tire 13 (in this case affixed to the side surface) such as a bar code, stamp, or mark through the windows 68 and 69 as the tire 13 is rotated. Information concerning the tire 13 is thus obtained and is output to an unillustrated image processing apparatus. As a result, the type, production sequence, production plant, and the like of the tire 13 are identified and pick up, sorting, lot management, and the like of the tire 13 are carried out. If the tire information reading mechanism 66 is mounted on a member such as the vertically traveling frame 23, the fixed circular plate 32, or the rotating circular plate 45 which moves along the central axis of the tire 13 integrally with the gripping rollers 36 and 39, no special member, such as a fixed frame separate to the chuck apparatus 15, for mounting the tire information reading mechanism 66 is required enabling the structure to be simplified.

Thereafter, after the tire 13 has undergone whatever finishing processes and the like may be necessary, it is transported to the next operation by the chuck apparatus 15 while being guided by the guide rail 17.

Next, the operation of the first embodiment of the present invention will be described.

In this case, it will be assumed that the horizontally placed tire 13 has been transported to the gripping position directly beneath the gripping rollers 36 and 39 by the rotation of the rollers 12 of the conveyor 11, and is stopped in that position. At this time, it is usual for the central axis of the stopped tire 13 and the center of the chuck apparatus 15, namely, the center of a single circle running through the axes of rotation of each of the gripping rollers 26 and 39, to be positioned slightly out of alignment with each other due to deviations when the tire 13 is transported onto the conveyor 11, movement during transportation, deviations in the stopping position of the conveyor 11, and the like. Moreover, at this time, the supporting member 54 is stopped at its upper limit position while the gripping rollers 36 and 39 are contracted to their maximum in the radial direction of the tire (i.e. are moved to the inner limit in the radial direction) and stopped directly above the tire 13.

Next, when gripping the tire 13 using the chuck apparatus 15, firstly, the motor of the vertically traveling mechanism 28 is operated and the threaded shaft 25 is operated. This causes the supporting member 54 and the gripping rollers 36 and 39 to move integrally so as to approach the tire 13 from above along the central axis of the tire 13. The gripping rollers 36 and 39, which are in a contracted state as described above, are thus placed within the bead portions 27.

From this state, if the cylinder 51 of the expansion/contraction mechanism 55 is operated causing the piston rod 52 to protrude outwards, the rectilinear motion of the piston rod 52 is converted into rotational motion by the rack 53 and pinion 44 causing the rotating circular plate 45 to rotate in the counter clockwise direction as seen in FIG. 2. As a result, the gripping rollers 36 and 39 move simultaneously together with the sliders 35 to the outer side in the radial direction while being guided by the guide rails 33 so as to expand in the radial direction of the tire and come into contact with the inner periphery of the upper bead portion 27. If, at this time, the central axis of the tire is not aligned with the center of the chuck apparatus 15, as described above, the gripping rollers 36 and 39 contact the internal periphery of the bead portion 27 one after the other with a small time difference between each contact. Note that, at this time, the tire information reading mechanism 66 also rotates integrally with the rotating circular plate 45, however, because the arc-shaped window 69 is formed in the fixed circular plate 32, the field of vision of the tire information reading mechanism 66 is always secured and no problem occurs in reading the side face of the tire.

If, at the time of contact as described above, the amount of friction resistance between the tire 13 and the conveyor 11 is significantly large so that the tire 13 is unable to move in the axial direction of the rollers 12, for example, then the bead portion 27 is pushed by the gripping roller 36 or 39 which has made contact first and is slightly deformed in portions. In the present embodiment, however, at the same time as the gripping rollers 36 and 39 begin to expand, the drive motor 58 of the rotation drive mechanism 63 is operated causing the gripping roller 36 to rotate. The result of this is that when the gripping roller 36 makes contact with the inner periphery of the bead portion 27, the rotational force of the gripping roller 36 is transmitted to the tire 13 causing the tire 13 to rotate around the central axis thereof. Consequently, the tire 13 is shifted to a position in which all of the gripping rollers make contact with the inner periphery of the tire bead portion.

Because the rollers 36 and 39 in contact with the bead portion 27 rotate around an axis that is parallel to the central axis of the tire 13, the rollers 36 and 39 do not inhibit the rotation of the tire 13. As a result, the above shifting of the tire 13 can take place easily and smoothly. Because of this, the above described deformation of the bead portion 27 is prevented and the result of this is that mispositioning between the central axis of the tire 13 and the center of the chuck apparatus 15 is reduced. In short, the tire 13 is gripped from the inside by the gripping rollers 36 and 39 in a state in which the central axis of the tire 13 has been accurately positioned relative to (coincided with) the center of the chuck apparatus 15, Next, if the threaded shaft 25 of the vertically traveling mechanism 28 is rotated in the opposite direction to the direction in which it was previously rotated, the supporting member 54 and the gripping rollers 36 and 39 are raised up and the tire 13 which is gripped by the gripping rollers 36 and 39 is lifted off the conveyor 11. At this time, the toe of the bead portion 27 is caught by the flange portions 40 of the gripping rollers 36 and 39 so that the tire 13 does not fall from the gripping rollers 36 and 39.

Next, the tire information reading mechanism 66 is operated and the reading of the tire information attached to the side face of the tire 13 via the windows 68 and 69 is begun. If, at this time, the tire 13 is rotated by the drive motor 58 via the gripping roller 36, the side face of the tire passes continuously within the field of vision of the tire information reading mechanism 66 even if the tire information reading mechanism 66 is stationary. This allows the reading to be easily carried out over the entire periphery of the tire 13. Consequently, there is no need to turn the tire information reading mechanism 66 around the periphery of the tire 13 enabling the chuck apparatus as a whole to be reduced in size and lowered in production cost.

Figure 3:
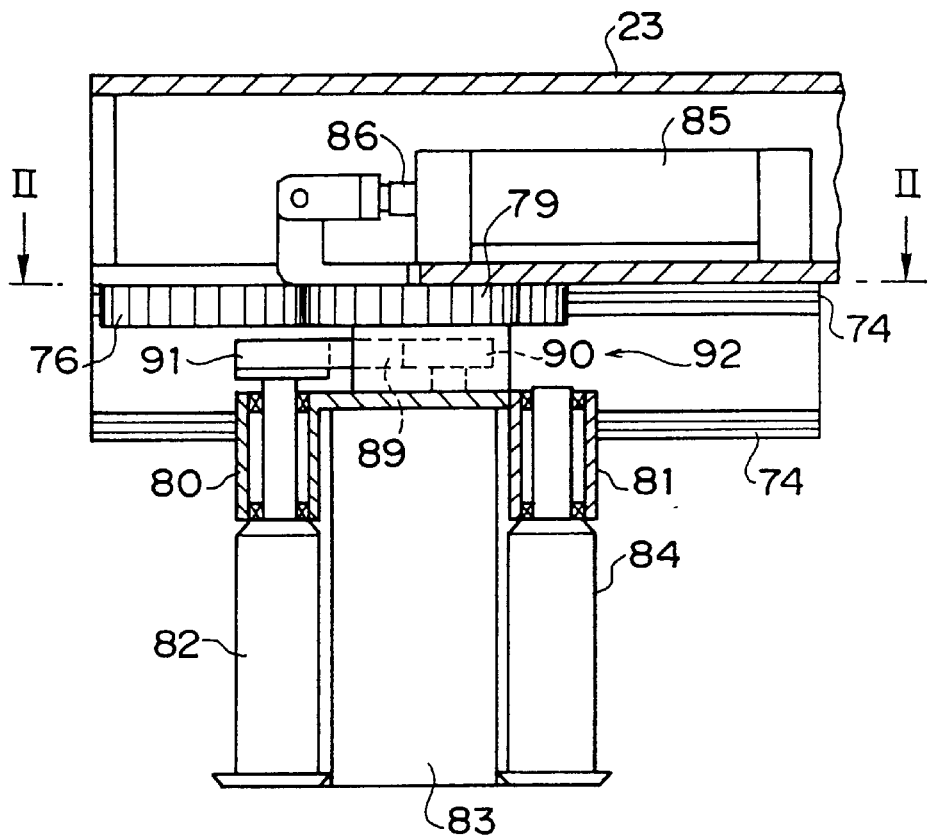
FIG. 3 is a partially broken-out front elevational view of the vicinity of a gripping roller showing the second embodiment of the present invention.
Figure 4:
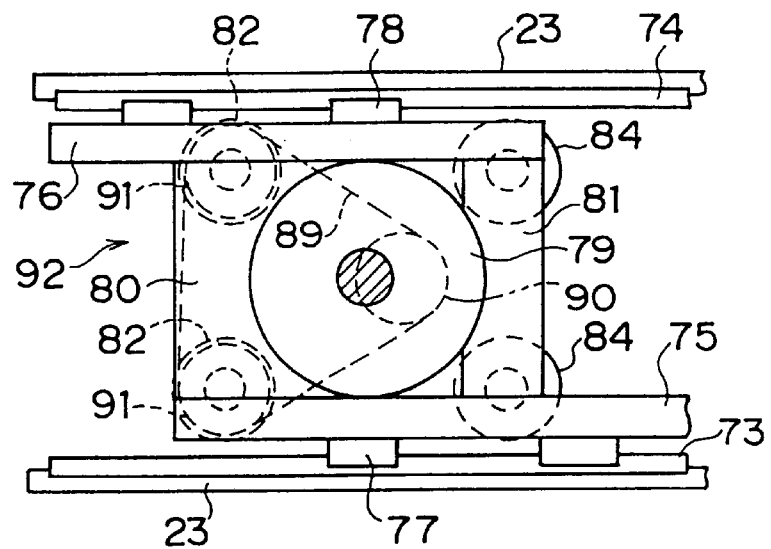
FIG. 4 is a view taken along the line between the arrows H—H in FIG. 3.

FIGS. 3 and 4 are diagrams showing the second embodiment of the present invention. In this embodiment, the gripping rollers are expanded and contracted in the radial direction of the tire by being moved along straight lines substantially in parallel.

Namely, in FIGS. 3 and 4, guide rails 73 and 74 extending substantially in parallel are mounted on the bottom faces of both side portions of the vertically traveling frame 23. Slide bearings 77 and 78 which are fixed to racks 75 and 76 are engaged with the guide rails 73 and 74 so as to be able to slide along the guide rails 73 and 74. 79 denotes a pinion which is rotatably supported by the vertically traveling frame 23. The pinion 79 is disposed between the racks 75 and 76 and meshes with both of the racks 75 and 76.

80 and 81 denote movable bases fixed respectively to the racks 75 and 76. Two gripping rollers 82 which rotate around an axis parallel to the central axis of the tire 13 are supported by the movable base 80 and a motor 83 serving as a drive source is attached thereto. Two gripping rollers 84 which each rotate around an axis parallel to those of the gripping rollers 82 are supported by the movable base 81. 85 denotes a cylinder serving as an approach/retract mechanism mounted on the vertically traveling frame 23. The distal end of a piston rod 86 of the cylinder 85 is connected to the rack 75.

The result of this is that, when the cylinder 85 is operated, the rack 75 and movable base 80 are moved by the rotation of the pinion 79 along the direction of the above straight line while being guided by the guide rails 73 and 74. At the same time, the rack 76 and movable base 81 are moved by the rotation of the pinion 79 along the above straight line in the opposite direction to the rack 75 and movable base 80 while being guided by the guide rails 73 and 74. Consequently, the gripping rollers 82 and 84 are expanded or contracted in the radial direction of the tire.

89 denotes a belt. The belt 89 is entrained between a pulley 90 fixed to an output shaft of the motor 83 and two pulleys 91 fixed to the top ends of the two gripping rollers 82. When the two gripping rollers 82 are rotated by the motor 83 when the gripping rollers 82 and 84 are expanded in the radial direction of the tire so as to be in contact with the inner periphery of the bead portion 27 of the tire 13, the tire 13 receives a rotational force from the gripping rollers 82 and is rotated around the central axis thereof. Taken as a whole, the motor 83, the belt 89, and the pulleys 90 and 91 form a rotation drive mechanism 92 for rotating the tire 13 around its central axis by rotating the two gripping rollers 82.

Furthermore, in the present embodiment, the structure for expanding and contracting the gripping rollers 82 and 84 in the radial direction of the tire is simplified, allowing production costs to be reduced. Note that the rest of the structure and operation are the same as those in the first embodiment.

Figure 5:
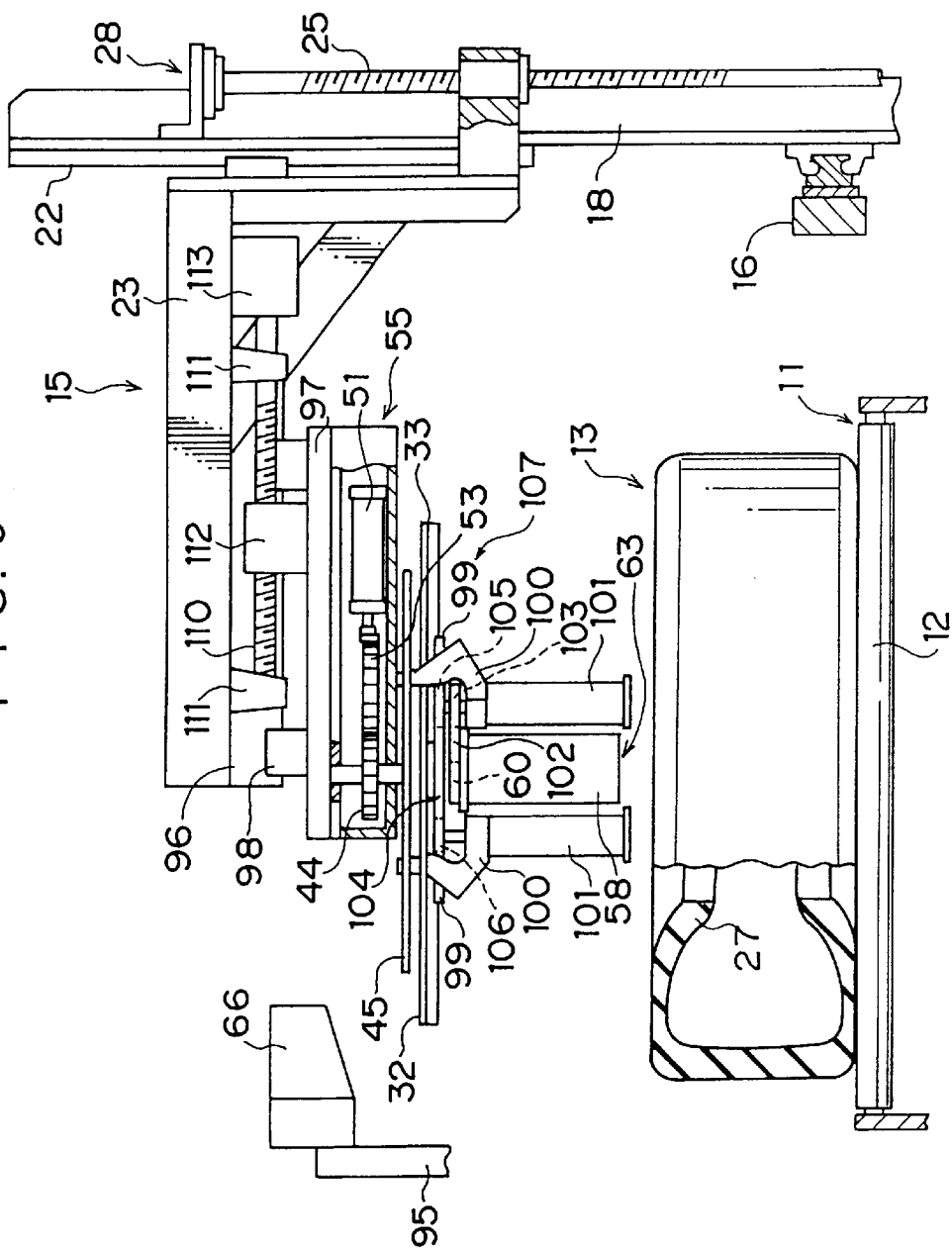
FIG. 5 is a partially broken-out front elevational view showing the third embodiment of the present invention.

FIG. 5 is a view showing the third embodiment of the present invention. In this embodiment, the tire information reading mechanism is removed from the tire chuck apparatus and mounted on a separate supporting frame. Moreover, in order to move the tire to the reading position, the gripping rollers have been made capable of moving within a horizontal plane.

Namely, in FIG. 5, 95 denotes a supporting frame disposed at the side of the conveyor 11 on the opposite side to the chuck apparatus 15. Tire information reading mechanism 66 for reading tire information is mounted on the supporting frame 95. Guide rails 96 extending along the vertically traveling frame 23 are mounted to the bottom surface of the vertically traveling frame 23. Slide bearings 98 fixed to a movable base 97, on which are disposed the fixed circular plate 32, the expansion/contraction mechanism 55, and the rotation drive mechanism 63, are engaged with the guide rails 96 so as to be able to slide along the guide rails 96.

Slide bearings 99 and sliders 100 similar to the slide bearings 34 and sliders 35a are supported by the guide rails 33 of the fixed circular plate 32 so as to be able to slide along the guide rails 33. Gripping rollers 101 similar to the gripping rollers 36 are rotatably supported by the plurality (four in this case) of sliders 100. 102 denotes a belt entrained between the pulley 60 of the drive motor 58 and a pulley 103 fixed to any one of the gripping rollers 101. 104 denotes a belt entrained between a pulley 105 fixed to one of the gripping rollers 101 and pulleys 106 fixed to the other the gripping rollers 101.

Taken as a whole, the above drive motor 58, pulley 60, belt 102, pulley 103, belt 104, and pulleys 105 and 106 form a rotation drive mechanism 107 for rotating the tire 13 by simultaneously rotating all the gripping rollers 101. If all the gripping rollers 101 are rotated in this way, it is possible to continuously apply rotational force to the tire 13 from the time the first gripping roller 101 comes into contact with the bead portion 27. Consequently, the alignment of the central axis of the tire 13 with the center of the chuck apparatus 15 can be smoothly carried out.

110 denotes a threaded shaft rotatably supported by bearings 111 mounted on the bottom surface of the vertically traveling frame 23. The threaded shaft 110 is threaded through a threaded member 112 fixed to the movable base 97. An output shaft of a motor 113 mounted on the vertically traveling frame 23 is connected to the threaded shaft 110. As a result, when the gripping rollers 101 are gripping the tire 13 from within, if the motor 113 is operated and the threaded shaft 110 rotated, the movable base 97 and the gripping rollers 101 move integrally towards the tire information reading mechanism 66 within a horizontal plane thus moving the tire 13 to the reading position. Note that the rest of the structure and operation are the same as those of the first embodiment.

Figure 6:
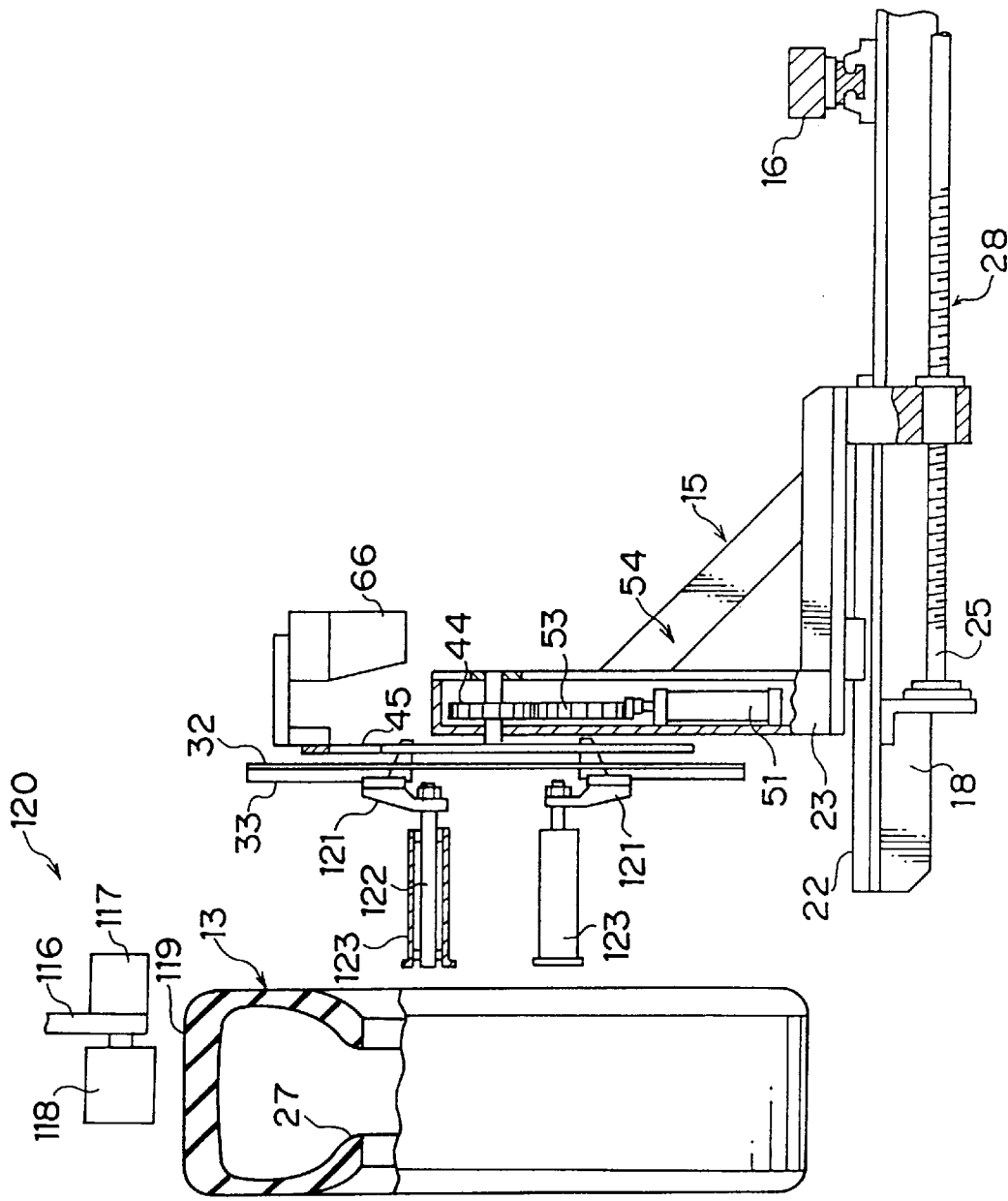
FIG. 6 is a partially broken-out front elevational view showing the fourth embodiment of the present invention.

FIG. 6 is a view showing the fourth embodiment of the present invention. In this embodiment, a vertically oriented tire is gripped by the chuck apparatus and the application of the rotational force on the tire is performed not by the gripping rollers, but by a separate drive roller.

In this case, a supporting post 18 is extended in a horizontal direction at the side of the tire 13, namely, is extended parallel to the central axis of the tire 13, and the vertically traveling frame 23 is extended in a vertical direction. A stinging arm 116 is provided swingable within a plane parallel to the equatorial plane of the tire 13 and a motor 117 is fixed to the distal end of the swinging arm. A driver roller 118 is attached to an output shaft of the motor 117. As a result, if the drive roller 118 is rotated by the motor 117 while the drive roller 118 is being pushed against the tread portion 119 of the tire 13, a rotational force is applied to the tire 13 around the central axis thereof from the drive roller 118. Taken as a whole, the swinging arm 116, the motor 117, and the drive roller 118 form a rotation drive mechanism 120 for rotating a tire 13 around the central axis thereof.

Because a separate rotation drive mechanism 120 for rotating the tire 13 is provided as described above, the drive motor 58, pulleys 60 and 61, and belt 62, as described in the first embodiment, are omitted. Further, sliders 121, supporting shafts 122, and gripping rollers 123, similar to the above sliders 35b, supporting shafts 37, and gripping rollers 39 respectively, are supported by the guide rails 33, however, the axis of rotation of the guide rollers 123 is parallel to the central axis of the tire 13, namely, extends horizontally. Note that the rest of the structure and operation are the same as in the first embodiment.

Figure 7:
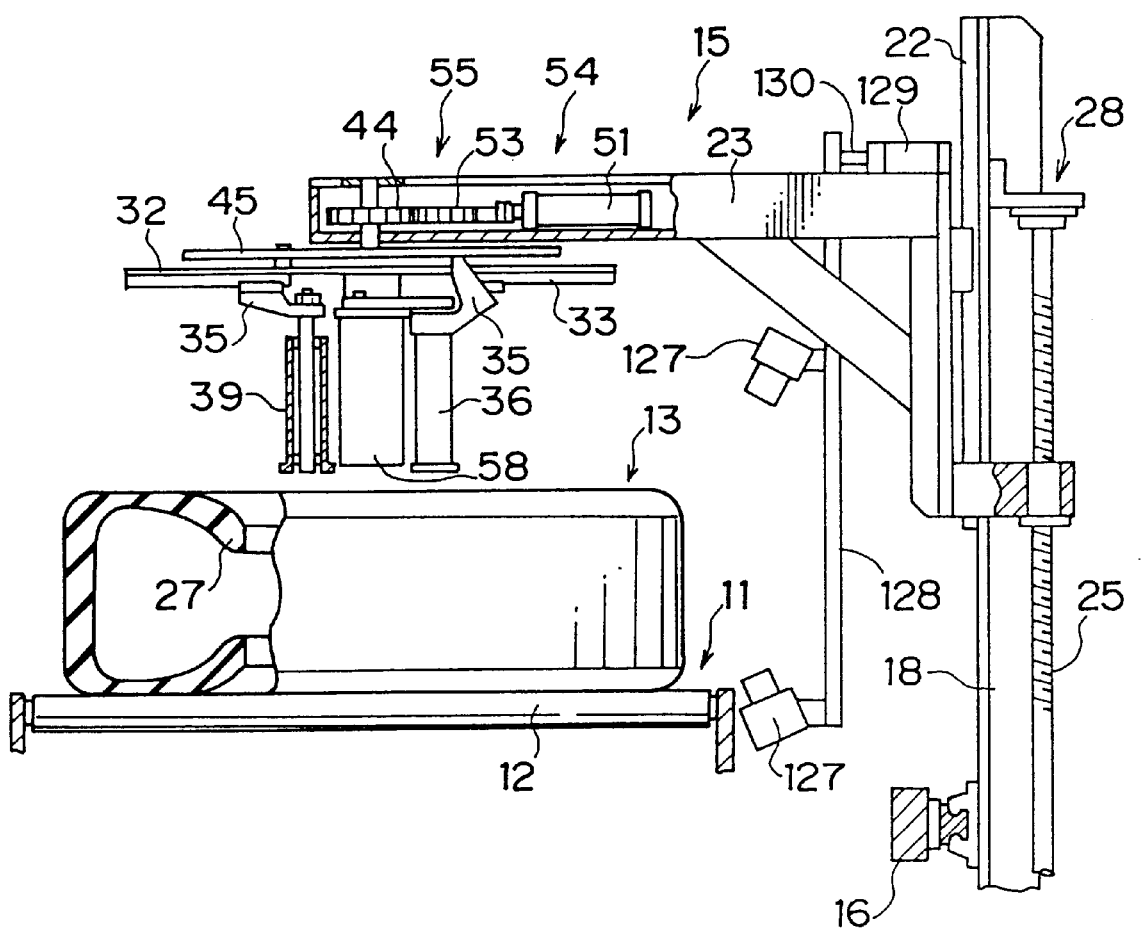
FIG. 7 is a partially broken-out front elevational view showing the fifth embodiment of the present invention.

FIG. 7 is a view showing the fifth embodiment of the present invention. In this embodiment, in place of the tire information reading mechanism 66, a surface condition reading mechanism 127 such as a camera or the like is provided at the periphery of the tire 13 for reading the surface condition of the side surface of the tire 13.

Namely, in FIG. 7, 128 denotes a supporting rod extending in a vertical direction. The supporting rod 128 is supported by a member which moves along the central axis of the tire 13 integrally with the gripping rollers 36 and 39 (in this case, the base end portion of the vertically traveling frame 23). 129 denotes a cylinder mounted on the vertically traveling frame 23. The supporting rod 128 is connected to the distal end of a piston rod 130 of this cylinder 129. As a result, when the cylinder 129 is operated, the supporting rod 128 moves in the longitudinal direction of the vertically traveling frame 23 so as to approach or move away from the horizontally placed tire 13.

A pair of surface condition reading mechanisms 127 for reading from above/below the surface condition, for example, external damage, soiling, glazing, and the like of the side surface of the tire 13 are mounted on the supporting rod 128. The surface condition reading mechanism 127 reads the surface condition of both side surfaces of the tire 13 which is gripped by the gripping rollers 36 and 39 as the tire 13 is being rotated and outputs the result to an unillustrated image processing apparatus. Note that the rest of the structure and operation are the same as in the first embodiment.

Figure 8:
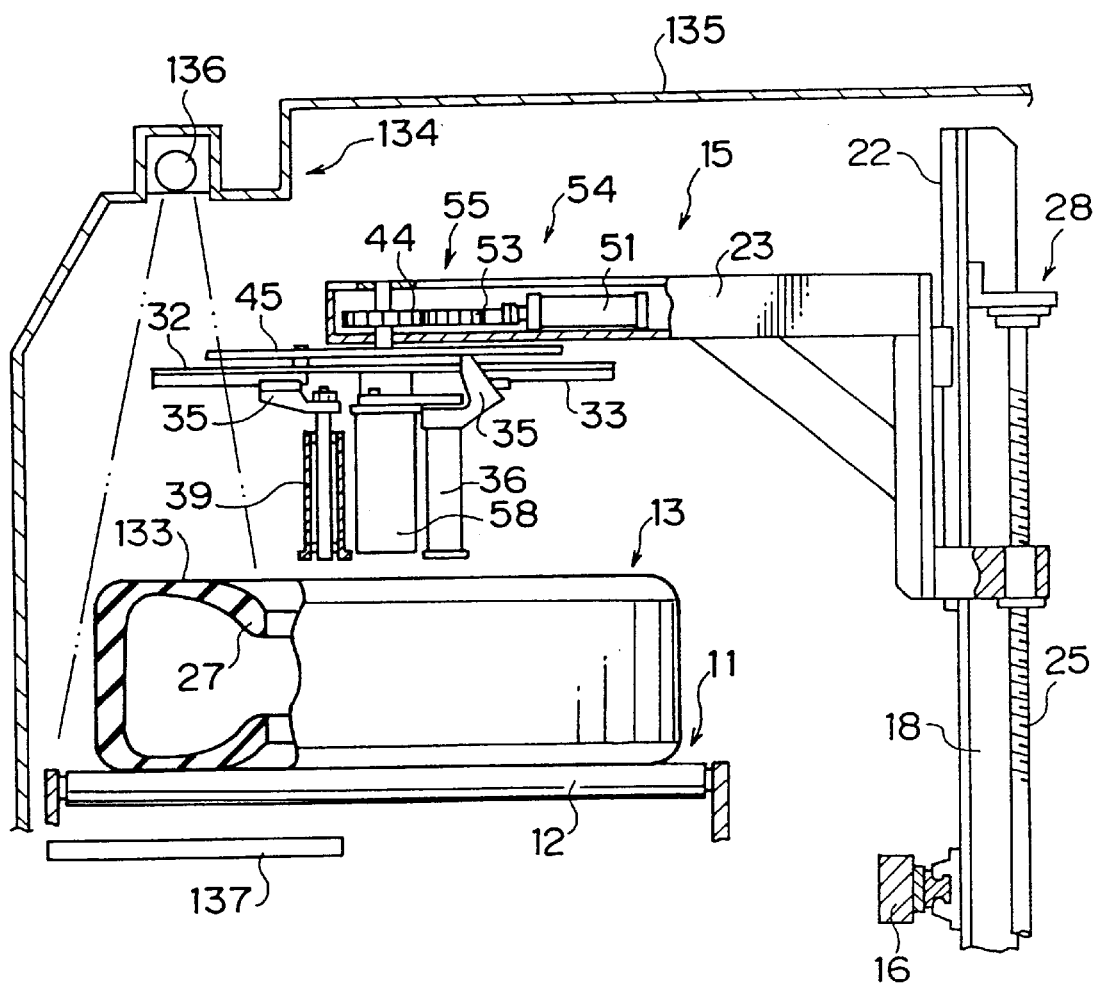
FIG. 8 is a partially broken-out front elevational view showing the sixth embodiment of the present invention.

FIG. 8 is a view showing the sixth embodiment of the present invention. In this embodiment, in place of the tire information reading mechanism 66, an internal condition reading mechanism 134 is provided in the vicinity of the tire 13 for reading the internal condition of the side wall (the bead portion 27, the side walls 133) of the tire 13, for example, bead wear, disruption in the carcass cord, and whether or not internal contaminants are present.

Namely, in FIG. 8, 135 denotes a shielding box surrounding the periphery of the chuck apparatus 15. An X-ray generating mechanism 136 is mounted to the internal surface of the shielding box 135 at a position directly above the tire 13. An image pickup sensor 137 for receiving X-rays emitted from the X-ray generating mechanism 136 which have passed through the tire 13 is disposed directly beneath the X-ray generating mechanism 136 and the tire 13. Taken as a whole, the X-ray generating mechanism 136 and the image pickup sensor 137 form the internal condition reading mechanism 134 for reading the internal condition of the side wall of the tire 13. The internal condition reading means 134 reads the internal condition of both side walls of a tire 13 which is gripped by the gripping rollers 36 and 39 as the tire 13 is being rotated and outputs the result to an unillustrated image processing apparatus. Note that the rest of the structure and operation is the same as in the first embodiment.

Figure 9:
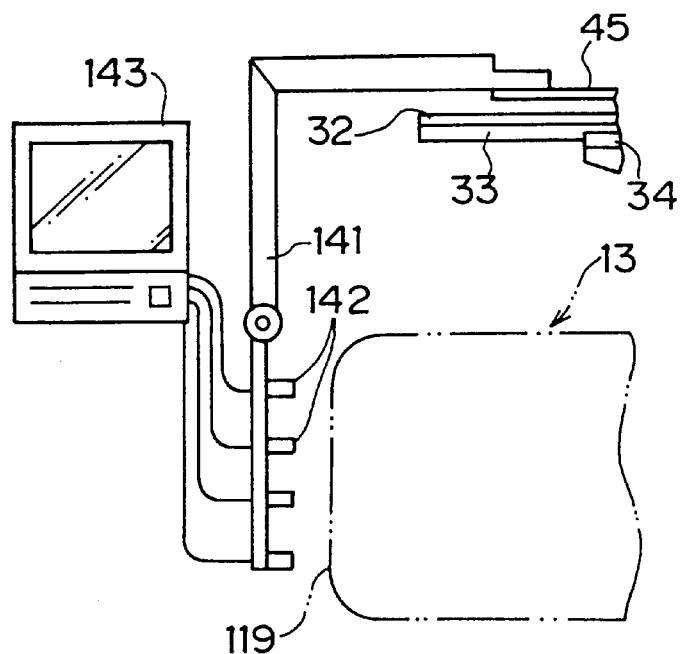
FIG. 9 is a front elevational view of the vicinity of tire information reading mechanism showing the seventh aspect of the present invention.

FIG. 9 is a view showing the seventh embodiment of the present invention. In this embodiment, although the tire information reading mechanism 66 is omitted, an L-shaped bracket 141 is fixed to the rotating circular plate 45 and a plurality of tire information reading mechanism 142 are mounted on the distal end portion of the bracket 141. In this case, the tire information reading mechanism 142 are disposed at the periphery of the tire 13 (at the outer side in the radial direction of the tread portion 119 in the present embodiment). The tire information reading mechanism 142 read tire information, for example, bar codes, stamps, and marks affixed to the outer peripheral surface (i.e. the surface of the tread portion 119) of the tire 13 as the tire 13 rotates and output the result to the image processing apparatus 143. Note that the rest of the structure and operation are the same as in the second embodiment.

Figure 10:
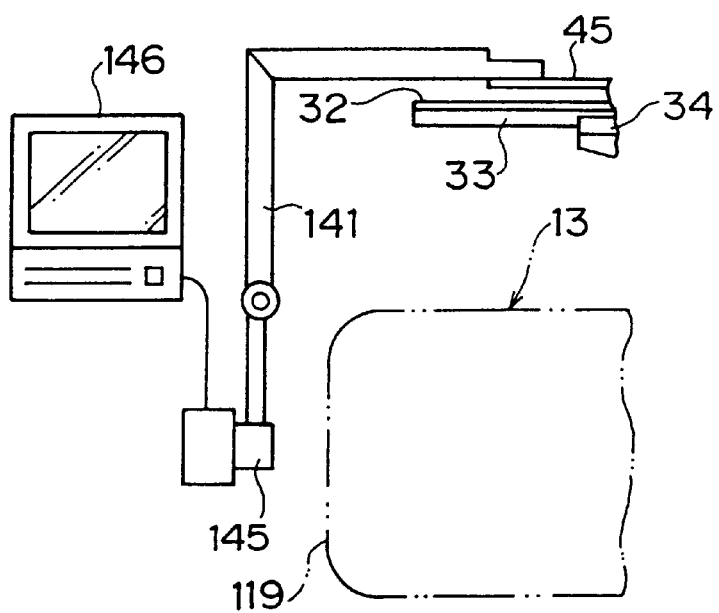
FIG. 10 is a front elevational view of the vicinity of surface condition reading mechanism showing the eighth aspect of the present invention.

FIG. 10 is a view showing the eighth embodiment of the present invention. In this embodiment, while the surface condition reading mechanism 127, the supporting rod 128, and the cylinder 129 are omitted, an L-shaped bracket 141 is fixed to the rotating circular plate 45 and a surface condition reading mechanism 145 is mounted on the distal end portion of the bracket 141. In this case, the surface condition reading mechanism 145 is disposed at the periphery of the tire 13 (at the outer side in the radial direction of the tread portion 119 in the present embodiment). The surface condition reading mechanism 145 reads the surface condition, for example, external damage, soiling, glazing, and the like of the outer periphery (i.e. the surface of the tread portion 119) of the tire 13 as the tire 13 rotates and outputs the result to the image processing apparatus 146. Note that the rest of the structure and operation are the same as in the fifth embodiment.

FIG. 11 is a view showing the ninth embodiment of the present invention. In this embodiment, while the X-ray generating mechanism 136 and the image pickup sensor 137 are omitted, an X-ray generating mechanism 150 is disposed at the inner side of the bead portion 27 of the tire 13 and an image pickup sensor 151 for receiving X-rays emitted from the X-ray generating mechanism 150 which have passed through the tread portion 119 of the tire 13 is disposed at the outer side in the radial direction of the tread portion 119 of the tire 13. In this case, because it is necessary to raise or lower the X-ray generating mechanism 150 in accordance with the size of the tire 13, the X-ray generating mechanism 150 is mounted on a vertically extending cylinder 152. Taken together, the X-ray generating mechanism 150 and the image pickup sensor 151 form the internal condition reading mechanism 153. The internal condition reading mechanism 153 reads the internal condition of the tread portion 119 of a tire 13, for example, disruption of the belt cord and whether or not internal contaminants are present, as the tire 13 is being rotated and outputs the result to the image processing apparatus 154. Note that the rest of the structure and operation are the same as in the sixth embodiment.

Note that in the above first embodiment, the gripping rollers 36 and 39 were inserted in a contracted state from above into the area within the bead portions 27 of the horizontally placed tire 13, however, in the present invention, it is also possible to insert the gripping rollers in a contracted state from below. Further, in the above first embodiment, both the task of aligning the central axis of the tire 13 with the center of the gripping rollers and the task of reading the information were performed using the chuck apparatus 15, however, in the present invention, it is also possible to only perform one of these tasks.

As described above, according to the present invention, a reduction in misaligned gripping of a tire during tire chucking, as well as a reduction in size and lowering of costs have been achieved.

What is claimed is:

1. A tire chuck apparatus for holding a tire having a tire bead, the apparatus comprising:
    (a) a gripping mechanism with at least two gripping rollers movable in tire radial direction from a retracted position to an extended position for pressing against the inner side of the bead portion of the tire and thereby holding the tire,
    wherein said gripping rollers are rotatable around an axis substantially parallel to a central axis of the tire; and
    (b) a rotation drive mechanism for rotating the tire around the central axis of the tire.

2. The tire chuck apparatus according to claim 1, wherein the rotation drive mechanism is connected to and rotates at least one of the gripping rollers, thereby causing tire rotation when a tire is being held.

3. The tire chuck apparatus according to claim 1, wherein the rotation drive mechanism includes a drive source mounted in a position centrally surrounded by the gripping rollers.

4. The tire chuck apparatus according to claim 1, wherein the rotation drive mechanism causes at least one gripping roller to begin to rotate substantially at the same time as when the gripping rollers begin to move to an extended position.

5. The tire chuck apparatus according to claim 1, wherein the gripping rollers retract and extend along substantially straight lines.

6. The tire chuck apparatus according to claim 1, further comprising a tire information reading device provided near a periphery of the tire when the tire chuck apparatus holds a tire, for reading tire information on a surface of the tire.

7. The tire chuck apparatus according to claim 1, further comprising a tire information reading device mounted to a movable member which moves integral with the gripping rollers along the central axis of a tire.

8. The tire chuck apparatus according to claim 1, further comprising a tire information reading device mounted to a supporting frame separate from the gripping rollers, the gripping rollers being movable within a substantially horizontal plane for moving a tire when it is held, to a position for reading by the tire information reading device.

9. A tire chuck apparatus for holding a tire having a tire bead, the apparatus comprising:
   (a) a gripping mechanism having at least two gripping rollers movable in tire radial direction between a retracted position and an extended position pressing against the inner side of the tire bead when the gripping mechanism is inserted axially in a tire, each gripping roller being rotatable about an axis substantially parallel to a central axis of the tire, when the gripping mechanism is inserted axially in the tire;
   (b) a rotation drive mechanism for rotating the tire around the tire's central axis; and
   (c) a tire information reading device provided near a periphery of the tire when the tire chuck apparatus holds a tire, for reading tire information on a surface of the tire.

10. The tire chuck apparatus according to claim 9, further including a movable member which moves integral with the gripping rollers along the central axis of a tire, wherein the tire information reading device mounts to said movable member.

11. The tire chuck apparatus according to claim 9, further comprising a supporting frame separate from the gripping rollers, wherein the tire information reading device is mounted to the supporting frame, and the gripping rollers are movable within a substantially horizontal plane for moving a tire when it is held, to a position for reading by the tire information reading device.

12. The tire chuck apparatus according to claim 9, wherein the rotation drive mechanism connects to and rotates at least one gripping roller for thereby causing tire rotation when a tire is being held.

13. The tire chuck apparatus according to claim 9, wherein the rotation drive mechanism causes at least one of the gripping rollers to begin to rotate substantially at the same time as when the gripping rollers begin to move to an extended position.

14. The tire chuck apparatus according to claim 9, wherein the gripping rollers retract and extend along substantially straight lines.

15. A tire chuck apparatus for holding a tire having a tire bead, the apparatus comprising:
   (a) a gripping mechanism having at least two gripping rollers movable in tire radial direction between a retracted position and an extended position pressing against the inner side of the bead when gripping mechanism is inserted axially in a tire, each gripping roller being rotatable about an axis substantially parallel to a central axis of the tire, when the gripping mechanism is inserted axially in the tire;
   (b) a rotation drive mechanism for rotating the tire around the tire's central axis; and
   (c) a tire condition reading device for reading a condition of the tire.

16. The tire chuck apparatus according to claim 15, further including a movable member which moves integral with the gripping rollers along the central axis of a tire, wherein the tire condition reading device mounts to said movable member.

17. The tire chuck apparatus according to claim 15, wherein the rotation drive mechanism connects to and rotates at least one gripping roller for thereby causing tire rotation when a tire is being held.

18. The tire chuck apparatus according to claim 15, wherein the tire condition reading device is adapted for reading a condition of the tire selected from the group consisting of a surface condition and an internal condition.

19. A method of gripping a tire, comprising the steps of:
   (a) pressing rollers against an inner periphery of a tire wherein the pressing rollers are movable in a tire radial direction from a retracted position to an extended position and rotatable around an axis substantially parallel to a central axis of the tire for holding the tire; and
   (b) rotating at least one of the rollers with a rotation drive mechanism for rotating the tire about its central axis.

20. The method for gripping a tire according to claim 19, further comprising a step of reading tire information of a tire surface when a tire is held by the pressing rollers.

* * * * *